(12) United States Patent
Kato et al.

(10) Patent No.: US 6,377,880 B1
(45) Date of Patent: Apr. 23, 2002

(54) COOLING FAN FAILURE DETECTION APPARATUS FOR HYBRID VEHICLE

(75) Inventors: Shinji Kato; Hiroshi Murakami; Morio Kayano; Shinobu Ochiai, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 09/661,286

(22) Filed: Sep. 13, 2000

(30) Foreign Application Priority Data

Sep. 14, 1999 (JP) .......................................... 11-261239

(51) Int. Cl.⁷ ........................... B60L 11/14; B60K 6/02; H01M 10/48
(52) U.S. Cl. ...................... 701/29; 180/65.2; 180/68.1
(58) Field of Search ..................... 701/29; 340/449; 180/65.1, 65.2, 65.3, 68.1, 68.2

(56) References Cited

U.S. PATENT DOCUMENTS 5,320,190 A * 6/1994 Naumann et al. .......... 180/68.2
5,490,572 A * 2/1996 Tajiri et al. ................. 180/65.1
6,009,362 A * 12/1999 Furukawa ..................... 361/33
6,186,254 B1 * 2/2001 Mufford et al. ............. 180/165

\* cited by examiner

*Primary Examiner*—Michael J. Zanelli
*Assistant Examiner*—Eric M Gibson
(74) *Attorney, Agent, or Firm*—Arent Fox Kintner Plotkin & Kahn, PLLC (57) ABSTRACT

The present invention relates to a cooling fan failure detection apparatus for a hybrid vehicle. This apparatus comprises a cooling capacity calculation device which calculates a cooling capacity of a cooling fan provided in the hybrid vehicle; a battery heating value calculation device which calculates a heating value of a battery provided in the hybrid vehicle; an assumed temperature change calculating device which calculates an assumed temperature change of the battery based on the heating value and the cooling capacity; an actual temperature change calculating device which calculates an actual temperature change of the battery; and a failure determination device which determines whether the cooling fan is failing by comparing the assumed temperature change calculated by the assumed temperature change calculating device and the actual temperature change calculated by the actual temperature change calculating device.

10 Claims, 4 Drawing Sheets

COOLING FAN FAILURE DETECTION APPARATUS FOR HYBRID VEHICLE

BACKGROUND OF THE INVENTION

1. Field of the Invention

The present invention relates to a cooling fan failure detection apparatus for detecting failure of a cooling fan provided for cooling a battery in a hybrid vehicle.

2. Description of the Related Art

Conventionally, hybrid vehicles which carry motors as power sources for driving the vehicles in addition to engines are known. Hybrid vehicles are divided into series hybrid vehicles and parallel hybrid vehicles. In the series hybrid vehicles, the engine drives a generator whose electric power output is used to drive the motor, which in turn drives the wheels. In this case, because the output of the engine is not mechanically connected to the driving wheels, the engine can be constantly driven within an engine-speed range of a high fuel mileage and a low emissions level. Therefore, the series hybrid vehicles can achieve lower fuel consumption and lower emissions levels than conventional engine vehicles.

In contrast, in the parallel hybrid vehicles, a motor is mechanically coupled to an engine so as to assist the rotation of the drive shaft of the engine. The motor can also act as a power generator to generate electrical power, and the generated electrical energy is stored in a battery. The electrical energy charged in the battery can be supplied to electrical equipment and the like in the vehicle.

In this case, although the output of the engine is mechanically connected to the driving wheels, drive loads on the engine can be reduced. Therefore, the parallel hybrid vehicles can also achieve lower fuel consumption and lower emissions levels than conventional engine vehicles.

The parallel hybrid vehicles can be divided into several types. One is a type in which a motor is connected to an output shaft of an engine so that the motor can assist the output of the engine, and when, for example, the vehicle decelerates, the motor acts as a generator to charge a battery or the like. Another is a type in which both or either of a motor and an engine can generate driving force, and a generator is independently provided.

These hybrid vehicles perform various controls, for example, when the vehicle accelerates, the motor assists the output of the engine, and when the vehicle decelerates, the motor generates electric power by deceleration regeneration to charge a battery or the like. Therefore, it is possible to constantly maintain electrical energy (the remaining battery charge) in the battery and to respond to demands by the driver of the vehicle.

It is well known that the charging efficiency of batteries used in hybrid vehicles is suddenly degraded when the temperature of the battery reaches a certain temperature. The temperature at which the charging efficiency is degraded depends on the performance of the battery. If charging of a battery is performed when the temperature of the battery is higher than the critical temperature, most of the charging energy is merely converted to heat, and the supplied electric energy cannot be stored in the battery. Furthermore, if charging or discharging of the battery is performed when the temperature of the battery is higher than the critical temperature, the temperature of the battery is further elevated, and the risk arises that the battery will deteriorate. Therefore, in a hybrid vehicle, a cooling fan is attached to the battery for cooling the battery so as to maintain the temperature of the battery under the temperature above which the charging efficiency is suddenly degraded.

However, if charging or discharging of a battery is performed when the driver of the hybrid vehicle does not notice the failure of the cooling fan, the temperature of the battery is unduly elevated, and deterioration of the battery may be accelerated. In order to prevent such a problem, it is necessary to detect the failure of the cooling fan in advance.

However, in order to detect the failure of the cooling fan, it is necessary to provide a sensor for detecting abnormality and a signal processing circuit for determining whether the cooling is failing or the like, and there arise problems such as increases in the manufacturing cost and the body weight of the hybrid vehicle. Furthermore, when the cooling capacity of a cooling fan is degraded due to blocking of the inlet or outlet of the cooling air passage, it is difficult to detect such a degradation of the cooling capacity by a simple electric method such as detection of the breaking of a wire or a short circuit.

SUMMARY OF THE INVENTION

The object of the present invention is to provide a cooling fan failure detection apparatus which can detect a failure of a cooling fan without using an additional sensor or an additional signal processing circuit.

In order to achieve the above object, a cooling fan failure detection apparatus of the present invention comprises a cooling capacity calculation device (temperature difference calculation unit 62 in the embodiment) which calculates a cooling capacity of a cooling fan provided in the hybrid vehicle; a battery heating value calculation device (input/output electric power calculation unit 61 in the embodiment) which calculates a heating value of a battery provided in the hybrid vehicle; an assumed temperature change calculating device (assumed temperature change calculation unit 63 in the embodiment) which calculates an assumed temperature change of the battery based on the heating value and the cooling capacity; an actual temperature change calculating device (actual temperature change calculation unit 64 in the embodiment) which calculates an actual temperature change of the battery; and a failure determination device (failure determination unit 66 in the embodiment) which determines whether the cooling fan is failing by comparing the assumed temperature change calculated by the assumed temperature change calculating device and the actual temperature change calculated by the actual temperature change calculating device.

Moreover, a hybrid vehicle of the present invention comprises an engine which outputs a driving force for the hybrid vehicle; a motor which outputs an assistant driving force so as to assist the driving force of the engine; a battery which supplies electric power to the motor when the assistant driving force is necessary, and which stores electric power generated by the motor when the assistant driving force is not necessary; a cooling fan which cools the battery; a cooling capacity calculation device which calculates a cooling capacity of a cooling fan provided in the hybrid vehicle; a battery heating value calculation device which calculates a heating value of a battery provided in the hybrid vehicle; an assumed temperature change calculating device which calculates an assumed temperature change of the battery based on the heating value and the cooling capacity; an actual temperature change calculating device which calculates an actual temperature change of the battery; and a failure determination device which determines whether the cooling fan is failing by comparing the assumed temperature change calculated by the assumed temperature change calculating device and the actual temperature change calculated by the actual temperature change calculating device.

According to the present invention, failure detection of the cooling fan is performed using outputs only from sensors which have been already provided for calculating the remaining battery charge in a battery control apparatus. Therefore, without providing additional dedicated sensors or the like, a failure detection of the cooling fan is possible, and increases in the manufacturing cost and the body weight of the hybrid vehicle can be prevented.

Furthermore, because this apparatus detects a failure of the cooling fan based on a change in the temperature of the battery, even if the cooling capacity of the cooling fan is degraded due to blocking of the inlet or outlet of the cooling air passage, it is possible to detect such a degradation of the cooling capacity.

DETAILED DESCRIPTION OF THE INVENTION

Hereinafter, the embodiments of the present invention will be explained referring to the figures.

Figure 1:
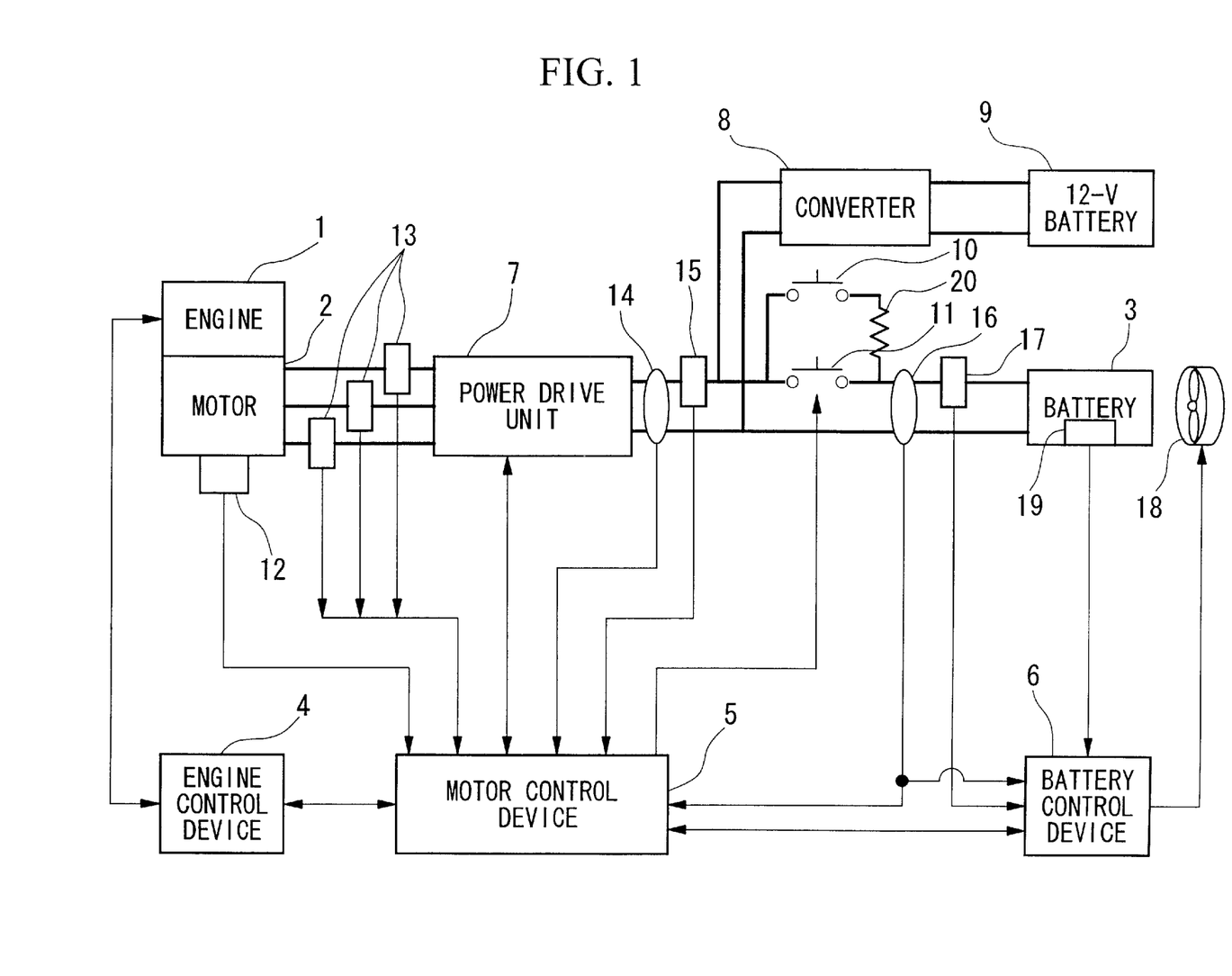
FIG. 1 is a block diagram illustrating a construction of a hybrid vehicle to which a first embodiment of the present invention is applied.

FIG. 1 is a block diagram illustrating a parallel hybrid vehicle to which a first embodiment of the present invention is applied. The vehicle comprises an engine 1 which is activated by the combustion energy of a fuel, and an electric motor 2 which is activated by electric power and assists the engine 1. The driving force generated by both the engine 1 and the electric motor 2 is transmitted via an automatic or a manual transmission (not shown) to driving wheels (not shown). At the time of the deceleration of the hybrid vehicle, the driving force is transmitted from the driving wheels to the electric motor 2, and the electric motor 2 functions as a generator. That is, the electric motor 2 recovers the kinetic energy of the vehicle body as electric energy.

A battery 3 is provided for supplying electric power to the electric motor 2 and for storing electric power generated by the electric motor 2 when the driving force of the electric motor 2 is not necessary. The battery 3 is a high voltage battery which includes a plurality of modules connected in series, and in each module, a plurality of cells are connected in series. A temperature sensor 19 is attached to each of the modules in the battery 3, and the modules are accommodated in a battery box. In the battery box, at least an inlet port and at least an outlet port are formed, and a cooling fan 18 is provided in the inlet port for performing air cooling of the modules. The inlet port is formed at a position where air in the vehicle can be introduced in the battery box, and the outlet port is formed at a position where exhaust air can be discharged to the outside of the vehicle.

In the following explanation, "battery temperature" means the maximum temperature among the temperatures measured by the temperature sensors 19 attached to the modules.

An engine control device 4 is provided for controlling the engine 1. This engine control device 4 monitors the engine speed and the velocity of the vehicle or the like at predetermined intervals, and determines the mode of the vehicle such as a regeneration mode, an assistance mode, and a deceleration mode, based on the results of the monitoring. The engine control device 4 also computes the assistance amount or the regeneration amount in correspondence with the determined mode, and transmits the information regarding the mode and the assistance/regeneration amount or the like to a motor control device 5. Based on the information received from the engine control device 4, the motor control device 5 controls a power drive unit 7 or the like so as to drive the electric motor 2 or to perform the regeneration by the electric motor 2.

A battery control device 6 is provided for computing the remaining battery charge SOC (state of charge) of the battery 3. This battery control device 6 also controls the cooling fan 18 in order to maintain the battery temperature lower than a predetermined value and to protect the battery 3.

In this embodiment, the engine control device 4, the motor control device 5, and the battery control device 6 are constructed by a CPU (central processing unit) and a memory, and their functions are actualized by running a suitable program in the CPU and the memory.

The power drive unit 7 comprises three modules connected in parallel, and each module consists of two switching elements connected in series. Each of the switching modules in the power drive unit 7 is turned on or off by the motor control device 5, and high voltage DC currents supplied to the power drive unit 7 from the battery 3 are supplied to the electric motor 2 via three-phase lines.

A 12-V battery 9 is provided for driving various accessories, and the 12-V battery 9 is connected to the battery 3 via a downverter 8. This downverter 8 reduces the voltage from the battery 3 and supplies the reduced voltage to the 12-V battery 9. The battery 3 and the power drive unit 7 are connected to each other via a precharging contactor 10 and a main contactor 11, and the precharging contactor 10 and the main contactor 11 are respectively turned on and off by the motor control device 5.

A motor sensor 12 is provided for detecting the rotational phase and the rotational speed of the electric motor 2, and current sensors 13 are provided respectively for measuring the electric currents Iu, Iv, and Iw flowing through the three-phase lines. The signals output from the motor sensor 12 and the current sensors 13 are transmitted to the motor control device 5.

A voltage sensor 14 and a current sensor 15 are provided respectively for measuring the voltage and the current to be input to the power drive unit 7. Furthermore, a voltage sensor 16 is provided for measuring the voltage of the battery 3. The voltage values and the current values measured by the sensors 14 to 16 are transmitted to the motor control device 5. A current sensor 17 is provided for measuring the current flowing in or out of the battery 3, and the measured current value is transmitted to the battery control device 6.

As is described above, the sensors 14 to 17 measure the voltage and the current at the battery 3 side of the contactors 10 and 11, and the voltage and the current at the power drive unit 2 side of the contactors 10 and 11. The current value output from the current sensor 15 corresponds to the value obtained by subtracting the current value flowing into the downverter 8 from the current value measured by the current sensor 17.

Next, the control procedure of the above apparatus will be explained. First, the battery control device 6 computes the remaining battery charge based on the current value and voltage value at the side of the battery 3, and transmits the remaining battery charge to the motor control device 5. The motor control device 5 outputs the received remaining battery charge to the engine control device 4.

The engine control device 4 determines the driving mode (assistance mode, regeneration mode, starting mode, deceleration mode or the like) and the electric power necessary for driving the electric motor 2, based on the remaining battery charge, the engine speed, the degree of throttle opening, the engine torque, and the actual motor torque or the like, and the engine control device 4 outputs the driving mode information and the necessary electric power information to the motor control device 5.

On receiving the driving mode information and the necessary electric power information from the engine control device 4, the motor control device 5 controls the power drive unit 7 as follows:

(i) When it is in the assistance mode or the deceleration mode, the motor control device 5 computes the necessary torque so as to equalize the electric power to be input to the power drive unit 7 (at the side of the voltage sensor 14 and the current sensor 15 in FIG. 1) with the necessary electric power indicated by the engine control device 4, and the motor control device 5 feedback-controls the power drive unit 7 so that the electric motor 2 generates the necessary torque.

(ii) When it is in the cruise mode, the motor control device 5 computes the necessary torque so as to equalize the electric power being supplied to the battery 3 (at the side of the voltage sensor 16 and the current sensor 17 in FIG. 1) with the necessary electric power indicated by the engine control device 4, and the motor control device 5 feedback-controls the power drive unit 7 so that the electric motor 2 generates the necessary torque.

(iii) When it is in the starting mode, the motor control device 5 controls the power drive unit 7 and controls the starting of the engine using the electric motor 2.

The motor control device 5 receives data regarding the actual torque from the power drive unit 7, and transmits the data to the engine control device 4.

The engine control device 4, the motor control device 5, and the battery control device 6 perform the above procedure at a predetermined timing so as to control the engine 1, the electric motor 2, and the battery 3, and to drive the vehicle.

Figure 2:
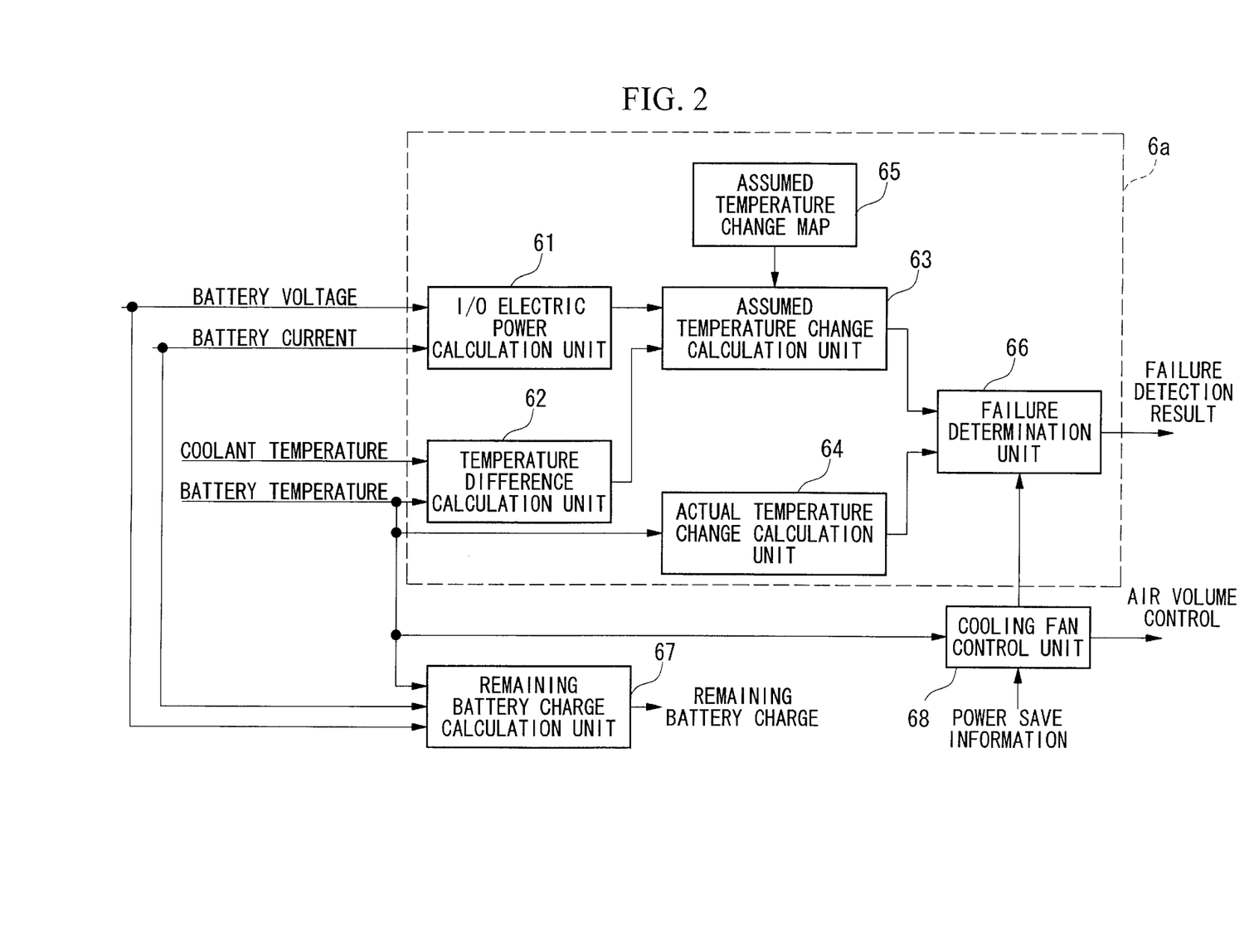
FIG. 2 is a block diagram illustrating a battery control device in the hybrid vehicle shown in FIG. 1.

Next, referring to FIG. 2, the battery control device 6 shown in FIG. 1 will be explained in detail. FIG. 2 is a block diagram of the battery control device 6, and the battery control device 6 comprises a failure detection unit 6a, a remaining battery charge calculation unit 67, and a cooling fan control unit 68.

The failure detection unit 6a comprises an input/output electric power calculation unit 61 (battery heating value calculation device), a temperature difference calculation unit 62 (cooling capacity calculation device), an assumed temperature change calculation unit 63 (assumed temperature change calculation device), an actual temperature change calculation unit 64 (actual temperature change calculation device), an assumed temperature change map 65, and a failure determination unit 66 (failure determination device).

The input/output electric power calculation unit 61 calculates values of the electric power input to or output from the battery 3 based on the voltage of the battery 3 and the charge and discharge electric currents input to or output from the battery 3. The temperature difference calculation unit 62 calculates the temperature difference between the temperature of a coolant (in this case, air in the vehicle) applied to the battery 3 by the cooling fan 18 and the temperature of the battery 3 itself. The assumed temperature change calculation unit 63 calculates an assumed temperature change based on the output of the input/output electric power calculation unit 61 and the output of the temperature difference calculation unit 62. The actual temperature change calculation unit 64 calculates the actual temperature change of the battery 3 based on the temperature of the battery 3.

The assumed temperature change map 65 is a map for defining the relationship between the electric power input to or output from the battery 3, the temperature difference between the coolant temperature and the battery temperature, and the temperature change of the battery 3 which should occur in those conditions. The failure determination unit 66 determines whether a failure has occurred in the cooling fan 18 based on the output of the assumed temperature change calculation unit 63 and the output of the actual temperature change calculation unit 64.

The remaining battery charge calculation unit 67 calculates the remaining battery charge (SOC) based on the voltage of the battery 3 (battery voltage), the electric current input to or output from the battery 3 (battery current), and the temperature of the battery 3 (battery temperature). The cooling fan control unit 68 controls the cooling fan 18 in accordance with the temperature of the battery 3.

In this embodiment, the outputs of the voltage sensor 16, the output of the current sensor 17, and the outputs of the temperature sensors 19 are respectively supplied to the battery control device 6 as the battery voltage, the battery current, and the battery temperature.

Next, referring to FIG. 2, the operation of the battery control device 6 will be explained. First, the remaining battery charge calculation unit 67 calculates the remaining battery charge using the values of the battery voltage, the battery current, and the battery temperature. There is a certain relationship between the battery voltage and the remaining battery charge, and the greater the remaining battery charge is, the higher the battery voltage becomes. When the remaining battery charge is in a middle range (about 20 to 80% of the maximum battery charge), the ratio of change of the battery voltage with respect to the change of the remaining battery charge is small. In contrast, when the remaining battery charge increases beyond a certain value (about 80% of the maximum battery charge), the battery voltage remarkably increases, and when the remaining battery charge decreases under below a certain value (about 20% of the maximum battery charge), the battery voltage remarkably decreases. Therefore, the remaining battery charge can be estimated by detecting the phenomenon that the battery voltage remarkably increases or decreases.

When the remaining battery charge is in the middle range, because the ratio of change of the battery voltage with respect to the change of the remaining battery charge is small, the remaining battery charge calculation unit 67 calculates the remaining battery charge by accumulating the charged amount and the discharged amount of the battery 3. However, this accumulating method has a problem that the detection error of the current is also accumulated. Therefore, in order to improve the precision of the remaining battery charge, it is necessary to reset the remaining battery charge value at a suitable timing. In this embodiment, the remaining battery charge is corrected by substituting the remaining battery charge value with a predetermined value (for example, 80% or 20%) when detecting the phenomenon that the battery voltage remarkably increases or decreases.

The remaining battery charge calculation unit 67 comprises a three-dimensional map (not shown) for storing the relationship between the battery temperature, the charging or discharging current of the battery 3, and the upper and lower critical values of the battery voltage at which the remaining battery charge becomes the predetermined values (for example, 80% or 20%). Using the present battery temperature value and the present charging or discharging current value of the battery 3, the remaining battery charge calculation unit 67 retrieves the three-dimensional map to determine the upper or lower critical battery voltage at the time that the remaining battery charge becomes one of the predetermined values. When the actual battery voltage reaches to the upper or lower critical battery voltages, the remaining battery charge calculation unit 67 resets the remaining battery charge to the predetermined value (for example, 80% or 20%).

The remaining battery charge value calculated by the remaining battery charge calculation unit 67 is transmitted to the motor control device 5, and the motor control device 5 controls the electric motor 2 based on the transmitted remaining battery charge value.

Next, an operation for controlling the cooling fan 18 will be explained. The cooling fan control unit 68 controls the cooling fan 18 in accordance with the battery temperature. In this embodiment, the cooling fan control unit 68 controls the wind speed generated by the cooling fan 18 at one of three levels (a high speed, a low speed, and an off state). It is not preferable for the battery 3 to be unduly cooled. If the battery temperature becomes excessively low or excessively high, the charging and discharging efficiencies of the battery 3 are degraded. Therefore, it is preferable to use the battery 3 while maintaining the battery temperature in an ordinary temperature range (for example, 0 to 50° C.). Therefore, the cooling fan control unit 68 controls the cooling fan 18 so that the wind speed becomes high when the battery temperature is higher than a predetermined upper limit value, and that the cooling fan 18 is stopped when the battery temperature is lower than a predetermined lower limit value.

Figure 3:
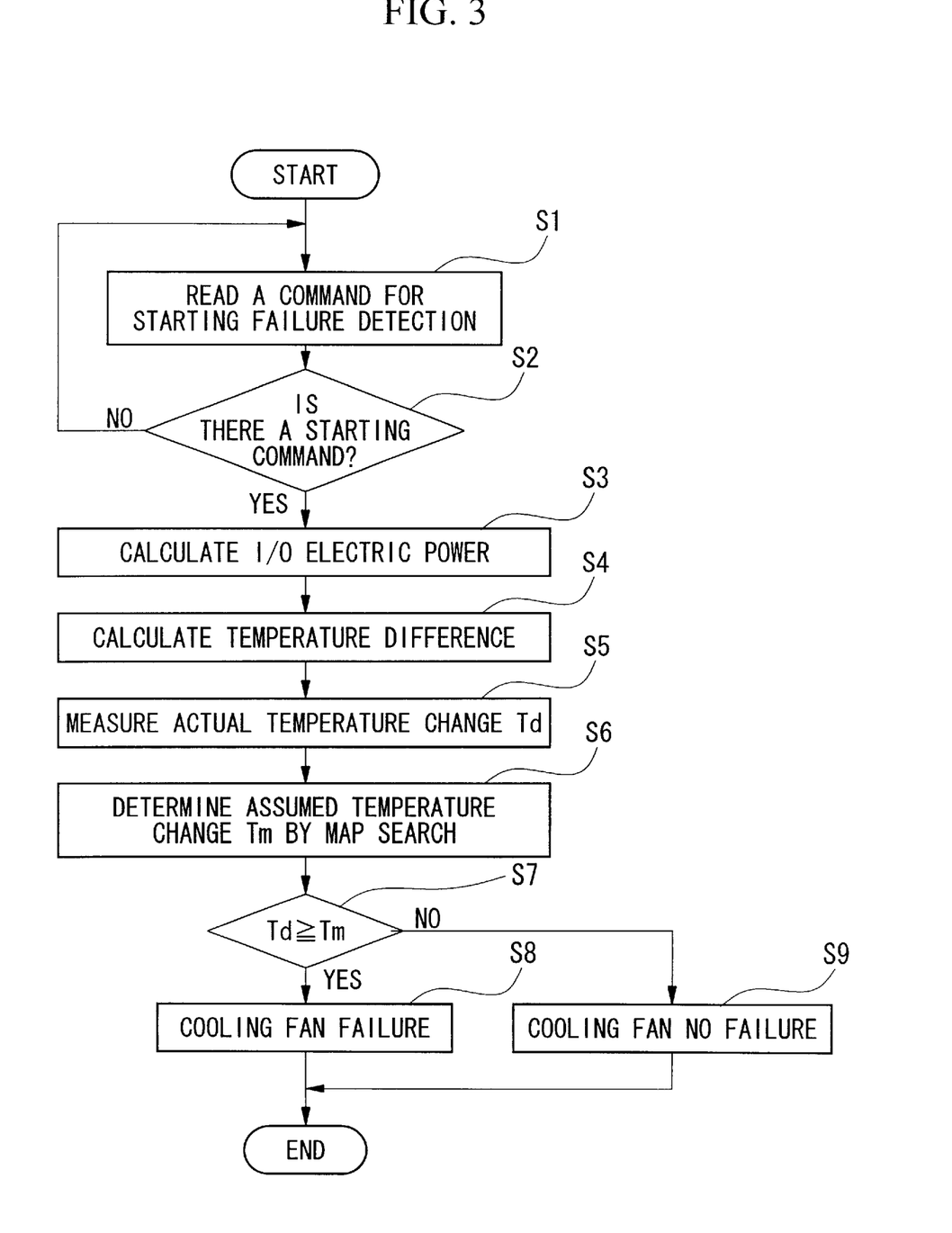
FIG. 3 is a flowchart for explaining the operation of a cooling fan failure detection unit shown in FIG. 2.

Next, referring to FIGS. 3 and 4, an operation for detecting failure of the cooling fan 18 will be explained. FIG. 3 is a flowchart illustrating steps in which the failure detection unit 6a detects the failure of the cooling fan 18, and FIG. 4 is a flowchart illustrating steps in which the cooling fan control unit 68 outputs a command for starting a failure detection of the cooling fan 18.

Figure 4:
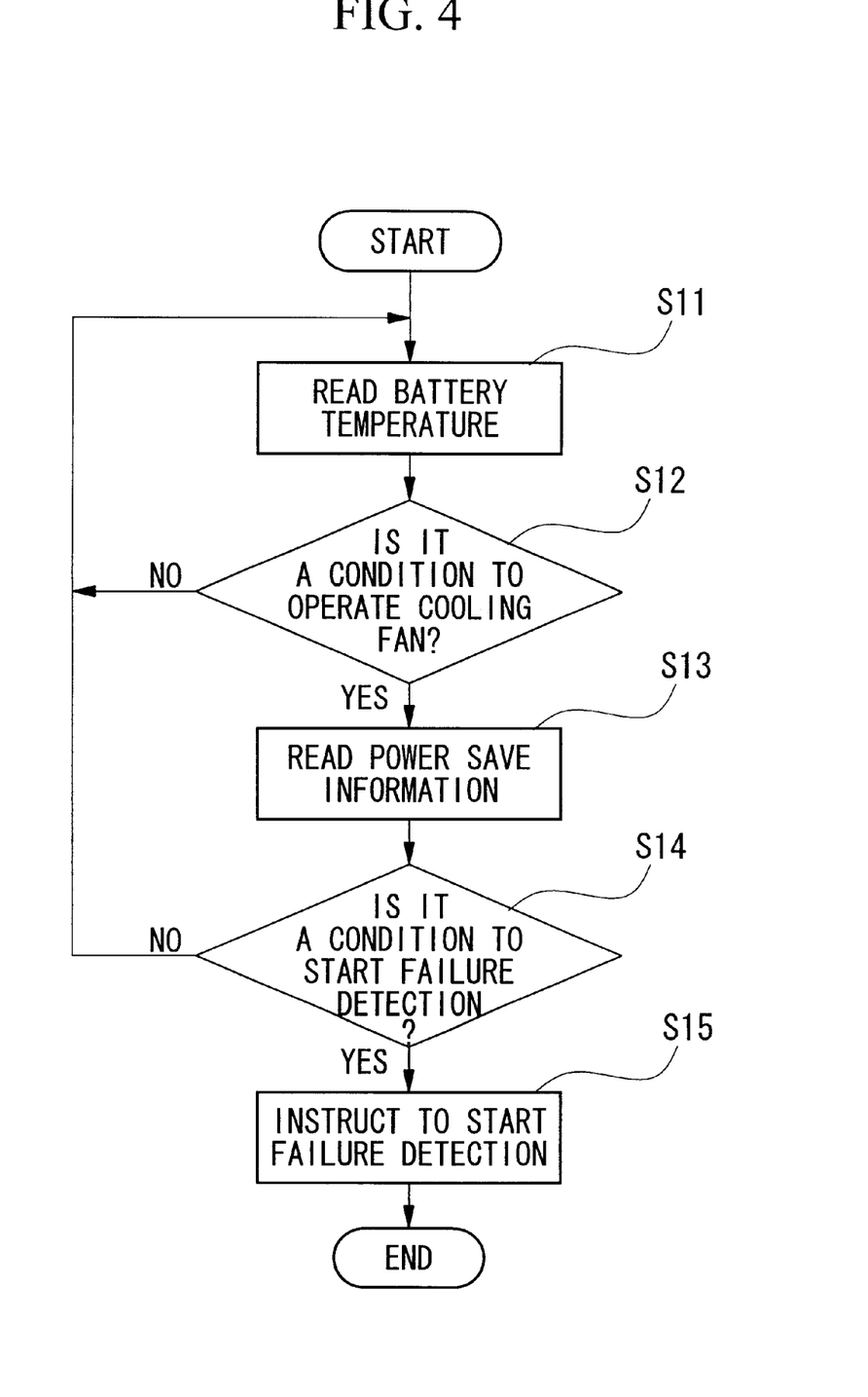
FIG. 4 is a flowchart for explaining the operation of a cooling fan control unit shown in FIG. 2.

As shown in FIG. 4, first, in step S11, the cooling fan control unit 68 reads the temperature of the battery 3 from the output signals from the temperature sensors 19 which are attached to modules in the battery 3.

Based on this battery temperature, the cooling fan control unit 68 determines whether it is a condition to operate the cooling fan 18 in step S12. If it is not a condition to operate the cooling fan 18, the flow returns to step S11, and the cycle will be repeated until it becomes a condition to operate the cooling fan 18.

In contrast, if it is a condition to operate the cooling fan 18, the cooling fan control unit 68 controls, based on the battery temperature read in step S11, the wind speed by the cooling fan 18. The cooling fan control unit 68 includes a map (not shown) for storing the relationship between the battery temperature and the wind speed by the cooling fan 18. The cooling fan control unit 68 retrieves the map, determines a suitable wind speed, and outputs a control signal indicating the suitable wind speed to the cooling fan 18. On receiving the control signal from the cooling fan control unit 68, the cooling fan 18 generates wind having the requested speed.

Next, in step S13, the cooling fan control unit 68 reads a power save information from the motor control device 5. The "power save" is a function for restricting the use of the electric motor 2 when the battery temperature rises beyond a predetermined threshold so as to prevent the degradation in the charging and discharging efficiencies of the battery 3 and the rise of the battery temperature due to the degradation in the charging and discharging efficiencies. The power save information is output from the motor control device 5, and it indicates whether or not a power save is being performed at present.

On receiving the power save information, the cooling fan control unit 68 determines whether it is necessary to start detecting a failure of the cooling fan 18 in step S14. If a power save is not being performed, the determination in step S14 is "No", and the flow returns to step S11 to repeat the above procedure. In contrast, if a power save is being performed, the determination in step S14 is "Yes", the flow proceeds to step S15, and the cooling fan control unit 68 outputs a command to the failure determination unit 66 so as to start a failure detection of the cooling fan 18. Thus, the cooling fan control unit 68 determines whether it is necessary to start detecting failure of the cooling fan 18 based on the battery temperature and the power save information.

Next, referring to FIG. 3, an operation in which the failure detection unit 6a detects failure of the cooling fan 18 will be explained. First, in step S1, the failure determination unit 66 reads a command from the cooling fan control unit 68, and in step S2, the failure determination unit 66 determines whether the command requires that failure detection of the cooling fan 18 be started. If the command from the cooling fan control unit 68 does not require that failure detection to be started, the flow returns to step S1, and the failure determination unit 66 awaits a starting command.

In contrast, if the command from the cooling fan control unit 68 requires that a failure detection be started, the failure determination unit 66 starts an operation for detecting a failure of the cooling fan 18, and outputs a signal indicating whether the cooling fan 18 is failing while a starting command is being output from the cooling fan control unit 68. This failure detection is performed according to the following procedure.

First, in step S3, the input/output electric power calculation unit 61 reads the voltage, and charge/discharge currents of the battery, and calculates the input/output electric power of the battery 3. The input/output electric power of the battery 3 is calculated by multiplying battery voltage and input/output current, and in this embodiment, the input/output electric power is an average electric power averaged for a predetermined period of time. The predetermined period of time is, for example, five minutes, and a timer (not shown) is provided for counting the period of time. Because the heating value of the battery 3 is proportional to the input/output electric power input to or output from the battery 3, it is possible to estimate the heating value of the battery 3 based on the input/output electric power.

Next, in step S4, the temperature difference calculation unit 62 reads the temperature of the coolant for cooling the battery 3 and the temperature of the battery 3, and calculates the temperature difference therebetween. In this embodiment, because the battery 3 is cooled by air in the vehicle, the coolant is air in the hybrid vehicle. The coolant temperature is measured by an air temperature sensor (not shown) provided in the hybrid vehicle. Instead, the coolant temperature may be measured by an air temperature sensor provided in an air conditioning system. The cooling capacity of the cooling fan 18 is proportional to the temperature difference between the coolant temperature and the battery temperature, it is possible to estimate the cooling capacity of the cooling fan 18 based on that temperature difference.

Next, in step S5, the actual temperature change calculation unit 64 calculates the actual temperature change Td of the battery 3 which has occurred in a predetermined period of time. This predetermined period of time is the same as the predetermined period of time to be counted by the timer for measuring the average electric power in step S3, that is, it is 5 minutes for example.

Next, in step S6, based on the input/output electric power calculated by the input/output electric power calculation unit 61 and the temperature difference calculated by the temperature difference calculation unit 62, the assumed temperature change calculation unit 63 calculates an assumed temperature change Tm of the battery 3 by retrieving the assumed temperature change map 65. This assumed temperature change map 65 defines the relationship between the input/output electric power input to or output from the battery 3, the temperature difference between the coolant temperature and the battery temperature, and the assumed temperature change Tm of the battery 3. Therefore, by means of applying to this map 65 the input/output electric power and the temperature difference between the coolant temperature and the battery temperature, it is possible to obtain the assumed temperature change Tm of the battery 3 which will occur in those conditions.

Next, in step S7, the failure determination unit 66 compares the assumed temperature change Tm obtained by the assumed temperature change calculation unit 63 with the actual temperature change Td obtained by the actual temperature change calculation unit 64. By this comparison, if the actual temperature change Td is greater than the assumed temperature change Tm, the flow proceeds to step S8, the failure determination unit 66 determines that the cooling fan 18 is failing, and transmits the failure determination result to the motor control device 5. The transmission of the failure determination result is performed only while the cooling fan control unit 68 is outputting a command for starting a failure detection. In contrast, if the actual temperature change Td is no more than the assumed temperature change Tm, the flow proceeds to step S9, the failure determination unit 66 determines that the cooling fan 18 is not failing, and transmits the determination result to the motor control device 5.

When the motor control device 5 receives a determination result indicating that the cooling fan 18 is failing, the motor control device 5 outputs an alarm signal to the driver of the hybrid vehicle, and further, restricts the charging and discharging of the battery 3. Therefore, the hybrid vehicle is driven only by the engine 1 without the power assistance by the electric motor 2. However, when the battery temperature is sufficiently low, the charging or discharging of the battery 3 may be performed.

In this embodiment, a failure detection of the cooling fan 18 is performed using outputs only from sensors which have been provided in advance for calculating the remaining battery charge in the battery control apparatus 6. Therefore, without providing additional dedicated sensors or the like, a failure detection of the cooling fan 18 is possible, and increases in the manufacturing cost and the body weight of the hybrid vehicle can be prevented.

Also, because this apparatus detects a failure in the cooling fan 18 based on a change in the temperature of the battery 3, even if the cooling capacity of a cooling fan 18 is degraded due to blocking of the inlet or outlet of the cooling air passage, it is possible to detect such a degradation of the cooling capacity.

Furthermore, because the use of the electric motor 2 is restricted in accordance with the failure detection result of the cooling fan 18, temperature rise of the battery 3 due to driving of the electric motor 2, and the deterioration of the battery 3 can be prevented.

Moreover, in the present embodiment, there is provided an assumed temperature change map 65 for defining the relationship between the electric power input to or output from the battery 3, the temperature difference between the coolant temperature and the battery temperature, and the assumed temperature change of the battery 3, and by means of applying to this map 65 the input/output electric power and the temperature difference between the coolant temperature and the battery temperature, the assumed temperature change Tm of the battery 3 is obtained. Therefore, the data processing in the assumed temperature change calculation unit 63 can be simplified, and an assumed temperature change Tm can be rapidly obtained. In addition, because the assumed temperature change Tm defined in the assumed temperature change map 65 is the value to be obtained when the battery 3 is in a normal state, if an abnormal rise in the battery temperature occurs due to some reasons, such an abnormality can be detected by using the assumed temperature change map 65.

Moreover, in the present embodiment, the failure detection unit 6a continuously repeats the processes in steps S3 to S5 shown in FIG. 3, and outputs a failure detection result when the cooling fan control unit 68 outputs a command for starting a failure detection. Therefore, a time lag between reception of a starting command and output of a failure detection result can be minimized, and it is possible to prevent charging or discharging of the battery 3 during the time lag in the case where the cooling fan 18 is failing.

In this embodiment, the temperature sensors 19 for measuring the battery temperature are attached to all the modules in the battery 3; however, the present invention is not limited to this configuration, and it is also possible to attach only one temperature sensor 19 to a selected module which is most susceptive of the cooling effect by the cooling fan 18.

The assumed temperature change calculation unit 63 may directly calculate the assumed temperature change Tm based on the input/output electric power of the battery 3 and the temperature difference between the coolant temperature and the battery temperature. In this case, because the assumed temperature change map 65 can be omitted, it is possible to reduce the memory capacity in the failure detection unit 6a.

In the case where the assumed temperature change map 65 is provided, values stored in the map 65 may be either values measured experimentally in the hybrid vehicle or values calculated based on a simulation.

Additionally, the assumed temperature change calculation unit 63 may calculate the assumed temperature change Tm using the input/output electric power of the battery 3 which is proportional to the heating value of the battery 3, and the failure determination unit 66 may perform a failure detection based on this the assumed temperature change Tm and the actual temperature change Td. This configuration can be applied to the case that the battery temperature at which a power save and a failure detection are performed is sufficiently higher than air temperature in the hybrid vehicle. When the battery temperature at which a power save is performed is sufficiently higher than air temperature (coolant temperature), because the influence by the coolant temperature decreases, a failure detection of the cooling fan 18 can be performed based on the ratio of the battery temperature rise with respect to the input/output electric power of the battery 3. That is, because the ratio of the battery temperature rise with respect to the input/output electric power of the battery 3 becomes greater when the cooling fan 18 is failing in comparison with when the cooling fan 18 is working, by means of storing a normal value of the ratio of the battery temperature rise with respect to the input/output electric power and comparing the actual value with the normal value, it can be determined whether the cooling fan 18 is failing. In this case, instead of the three-dimensional map 65, a two-dimensional map can be used for storing the relationship between the input/output electric power of the battery 3 and the assumed temperature change of the battery 3. Moreover, the measurement of the coolant (air) temperature can be omitted, and the operation for determining a failure of the cooling fan 18 can be simplified.

The present invention is not limited only to the above embodiment, but can be modified within the scope of the present invention.

What is claimed is:

1. A hybrid vehicle comprising:
   an engine which outputs a driving force for the hybrid vehicle;
   a motor which outputs an assistant driving force so as to assist the driving force of the engine;
   a battery which supplies electric power to the motor when the assistant driving force is necessary, and which stores electric power generated by the motor when the assistant driving force is not necessary;
   a cooling fan which cools the battery;
   a cooling capacity calculation device which calculates a cooling capacity of the cooling fan;
   a battery heating value calculation device which calculates a heating value of the battery;
   an assumed temperature change calculating device which calculates an assumed temperature change of the battery based on the heating value and the cooling capacity;
   an actual temperature change calculating device which calculates an actual temperature change of the battery; and
   a failure determination device which determines whether the cooling fan is failing by comparing the assumed temperature change calculated by the assumed temperature change calculating device and the actual temperature change calculated by the actual temperature change calculating device.

2. A hybrid vehicle according to claim 1, wherein the cooling capacity calculation device comprises a temperature difference calculation unit which calculates temperature difference between a temperature of a coolant applied to the battery by the cooling fan and a temperature of the battery.

3. A hybrid vehicle according to claim 1, wherein the battery heating value calculation device comprises an input/output electric power calculation unit which calculates values of the electric power input to or output from the battery based on a voltage of the battery and charge and discharge electric currents input to or output from the battery.

4. A hybrid vehicle according to claim 1, wherein the assumed temperature calculation device comprises an assumed temperature change calculation unit which calculates an assumed temperature change based on values of the electric power input to or output from the battery and temperature difference between a temperature of a coolant applied to the battery by the cooling fan and a temperature of the battery.

5. A hybrid vehicle according to claim 1, further comprising an assumed temperature change map which defines the relationship between an electric power input to or output from the battery, a temperature difference between temperatures of a coolant and the battery, and an assumed temperature change of the battery.

6. A cooling fan failure detection apparatus for a hybrid vehicle comprising:
   a cooling capacity calculation device which calculates a cooling capacity of a cooling fan provided in the hybrid vehicle;
   a battery heating value calculation device which calculates a heating value of a battery provided in the hybrid vehicle;
   an assumed temperature change calculating device which calculates an assumed temperature change of the battery based on the heating value and the cooling capacity;
   an actual temperature change calculating device which calculates an actual temperature change of the battery; and
   a failure determination device which determines whether the cooling fan is failing by comparing the assumed temperature change calculated by the assumed temperature change calculating device and the actual temperature change calculated by the actual temperature change calculating device.

7. A cooling fan failure detection apparatus according to claim 6, wherein the cooling capacity calculation device comprises a temperature difference calculation unit which calculates temperature difference between a temperature of a coolant applied to the battery by the cooling fan and a temperature of the battery.

8. A cooling fan failure detection apparatus according to claim 6, wherein the battery heating value calculation device comprises an input/output electric power calculation unit which calculates values of the electric power input to or output from the battery based on a voltage of the battery and charge and discharge electric currents input to or output from the battery.

9. A cooling fan failure detection apparatus according to claim 6, wherein the assumed temperature calculation device comprises an assumed temperature change calculation unit which calculates an assumed temperature change based on values of the electric power input to or output from the battery and temperature difference between a temperature of a coolant applied to the battery by the cooling fan and a temperature of the battery.

10. A cooling fan failure detection apparatus according to claim 6, further comprising an assumed temperature change map which defines the relationship between an electric power input to or output from the battery, a temperature difference between temperatures of a coolant and the battery, and an assumed temperature change of the battery.

* * * * *